April 24, 1962 V. C. MOORE 3,030,824
TRANSMISSION
Filed Nov. 22, 1957
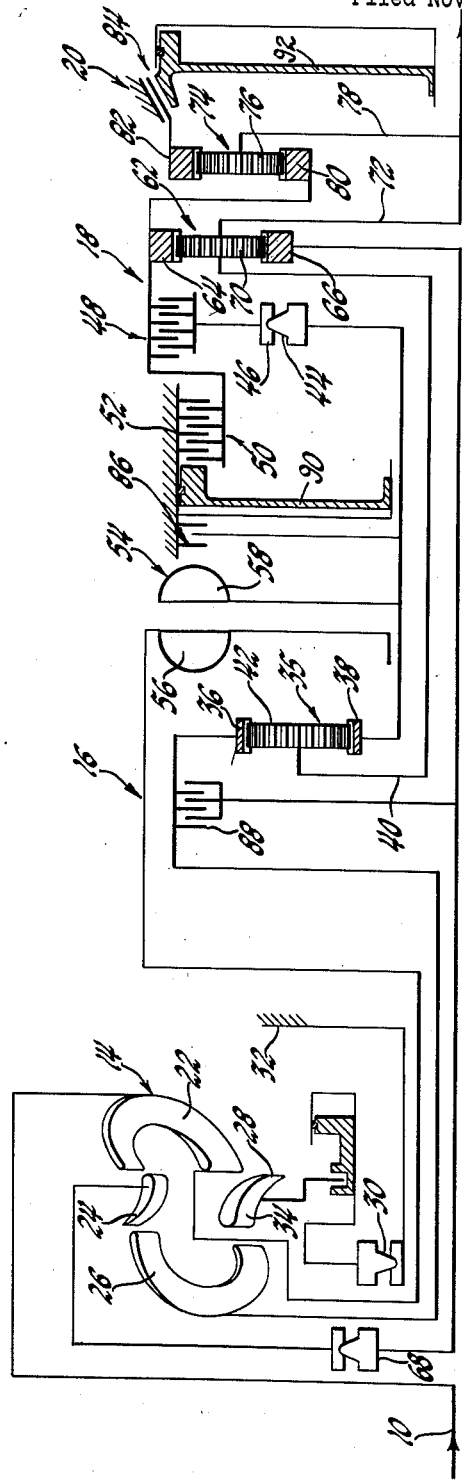
INVENTOR.
Victor C. Moore
BY
W. C. Middleton
ATTORNEY

3,030,824
TRANSMISSION

Victor C. Moore, Plymouth, Mich., assignor to General Motors Corporation, Detroit, Mich., a corporation of Delaware
Filed Nov. 22, 1957, Ser. No. 698,121
20 Claims. (Cl. 74—677)

This invention relates to improvements in arrangements of automatic transmissions adapted, although not exclusively, for use with motor vehicles.

Hydrodynamic torque transmitting devices, e.g., torque converters, are especially suited for automatic drives since they offer an infinite number of drive ratios over a selected range. These changes in ratio occur gradually and smoothly, a particularly desirable feature in vehicle transmissions. However, for certain driving conditions, a torque converter is inefficient, and hence the converter is combined with gearing to increase the overall efficiency. The addition of gearing, then, presents a problem since, to change the drive ratio of the gearing, gear shifts are necessary and they require accurate calibration to obtain a proper and smooth transition from one ratio to another. It is also desirable when gearing is combined with a torque converter that for normal driving speeds the torque converter either be locked up eliminating the infinite ratio feature, or the infinite ratios can still be made available by splitting the torque and having the torque converter only transfer a portion of the drive.

Also, to be considered in automatic transmissions is engine braking, especially when one-way devices are utilized to obtain ratio changes. For, in general, these devices are designed to lock when the engine is driving, but, when the vehicle wheels are driving, as during coast, the locked devices will unlock interrupting the drive connection to the engine. Consequently, the engine is of no assistance in slowing or braking the vehicle and necessarily the wheel brakes must be used oftener resulting in frequent replacement. Since the braking from the engine is inherently available at no expense in a cost sense, the advantages are obvious. Furthermore, when engine braking is provided, the degree or amount available is important. In some instances, only moderate braking is required whereas in others as when descending a steep hill more braking is preferable.

With these considerations in mind, the invention seeks to provide a transmission that has several operating ranges selectively available for different driving conditions including braking ranges, that affords a plurality of drive ratios with the transitions taking place smoothly and in a relatively imperceptible manner, that is efficient in operation, and that has the components arranged in a novel manner so as to be advantageously utilized and require a minimum number of such components.

By the invention a hydrodynamic torque transmitting device is combined with gearing in a unique way to afford plural ranges of engine braking for different driving conditions.

Specifically, the invention provides a torque converter having an impeller, a plurality of turbines, and an infinitely variable stator together defining a working circuit. The impeller and the turbines are all arranged to rotate different driven members at selected times so that during one phase of operation only part of the torque is transferred through the converter while during another phase the turbines are joined together.

Furthermore, the invention contemplates a transmission in which a torque converter is combined with planetary gearing to produce automatic and smooth drive ratio changes and in which the torque converter only transmits a portion of the torque during normal driving speeds. According to the invention, a gear ratio shift is accomplished by the cooperation of a fluid coupling, which is emptied and filled, and a one-way device so that the fluid coupling absorbs jars and shocks during the shift.

Further the invention utilizes a single brake in a novel way for holding the reaction elements of two gear units.

According to the invention, a hydrodynamic torque transmitting device is combined with a series of planetary gear units to provide a plurality of forward drive ratios and a reverse drive. The hydrodynamic torque transmitting device includes an impeller, primary and secondary turbines and a stator with plural positionable blades. One of the turbines drives one gear unit and the other another gear unit with the outputs from each gear unit being interconnected to rotate an output or driven shaft. The second gear unit reaction element is held against rotation in either direction by a brake and this same brake through a clutch and a one-way device holds the front unit reaction element from reverse rotation only. A fluid coupling is interposed between the first gear unit reaction element and the impeller so that when the coupling is filled with fluid a split torque drive is provided through the first gear unit, the one-way device being arranged to permit the first gear unit reaction element to rotate forwardly at this time. Since, in this arrangement, the secondary turbine, at stall, attempts to rotate backwards, a brake is provided which holds the first gear unit reaction element against rotation in either direction for the interval that the secondary turbine attempts to rotate backwards. This same brake during this phase of operation is automatically disengaged but may be maintained engaged for one range of engine braking. For another range of engine braking, the primary and secondary turbines are clutched together so that they function as a single turbine with the driven shaft driving.

The foregoing and other objects and advantages of the invention will be apparent from the following description and from the accompanying drawings in which:

The FIGURE illustrates schematically a transmission arranged to demonstrate the principles of the invention.

The transmission depicted in the drawing has a driving shaft 10 connected to a prime mover, such as a vehicle engine (not shown) and a driven shaft 12 which may be drive connected to the vehicle wheels in a well known manner. Interposed in the drive train between these shafts 10 and 12 for furnishing a plurality of forward drive ratios and a reverse drive are, in consecutive order, a hydrodynamic torque transmitting device, e.g., torque converter 14, a front planetary gear unit 16, a rear planetary gear unit 18 and a reverse planetary gear unit 20.

Torque converter 14 comprises an impeller 22 rotatable by the driving shaft 10, primary and secondary turbines 24 and 26, and a stator 28 of plural-blade-position construction which stator is prevented from backward rotation by a one-way device 30 grounded at 32. One-way device 30 may be of a known character utilizing a series of one-way elements such as sprags, rollers, or the like arranged to lock when the stator 28 attempts to rotate backwards and unlock so as to permit the stator to rotate forwardly at the coupling point of the converter 14. The blades 34 of the stator 28 are movable within predetermined limits in any appropriate manner, such as shown in the Kelly application S.N. 671,190, filed July 11, 1957, now Patent No. 2,911,786, to an infinite number of positions relative to the torque converter working circuit. In this way the stator blade-positions can be altered as desired so that the torque converter ratio can be varied to meet changing operating conditions. When the impeller 22 is rotated forwardly, fluid will traverse, in a counterclockwise direction, a path extending outwardly from the impeller through the primary and secondary turbines 24 and 26, stator 28 and back to the impeller 22. Initially, the fluid leaving the impeller 22 has a forward component which drives the primary turbine 24 in the same direction as the impeller 22 while the fluid leaving the primary turbine 24 has a negative component and attempts to rotate the secondary turbine 26 backwards. Similarly, the fluid leaving the secondary turbine 26 has a negative component which, since the stator 28 cannot rotate backwards, is altered so as to assist the impeller 22, i.e., the fluid has a forward component upon leaving the stator 28. When the impeller 22 and primary turbine 24 are rotating fast enough, the secondary turbine 26 is driven forwardly and both turbines 24 and 26 then transfer a positive torque. At some selected point in the operation of the torque converter 14, the fluid leaving the secondary turbine 26 will have a forward component thus driving the stator 28 in the forward direction and the converter will function like fluid coupling without multiplying torque.

Fluid pressure for operating the torque converter 14 and the ratio establishing devices for the various units may be supplied in a manner well known in the art. For example, pumps of any suitable structure may be driven by or at the speed or either the driving shaft 10 or the driven shaft 12.

Next to the torque converter 14, the front gear unit 16 is positioned and includes a planetary gear set 35. Gear set 35 has a ring gear 36 driven by the secondary turbine 26, a reaction sun gear 38, and an output planet carrier 40 on which are journaled a series of planet pinions 42 intermeshing with the gears 36 and 38. The reaction sun gear 38 is prevented from rotating backwards by a one-way device 44, similar to device 30, and has the outer race 46 thereof grounded through a neutral clutch 48 and a ground brake 50 at 52. With the sun gear 38 so restrained and the ring gear 36 being driven forwardly by the secondary turbine 26, the planet carrier 40 will likewise be driven forwardly but at a reduced speed. For a substantially direct drive through the gear set 35, another hydrodynamic torque transmitting device, as fluid coupling 54, is afforded which has a pump 56 connected to the torque converter impeller 22 and a turbine 58 joined to the reaction sun gear 38. When the coupling 54 is filled with fluid, the sun gear 38 will be driven forwardly at substantially the same speed as the torque converter impeller 22, a slight difference in speeds being due to the inherent slippage through the coupling 54. By filling the coupling 54 to start the shift, the fluid will absorb shocks as the one-way device 44 gradually releases and a smooth shift will be produced. In addition, assuming that the secondary turbine 26 is being driven forwardly at nearly the speed of the impeller 22, the ring and the sun gears 36 and 38 will be driven forwardly at approximately the same speed. Again, there is a slippage in the torque converter 14 so that the ring gear 36 will not be driven at exactly the same speed as the impeller 22. However, for all practical purposes, the front gear unit 16 can be considered locked up for direct drive when the coupling 54 is filled.

The rear planetary gear unit 18 has a gear set 62 which comprises a reaction ring gear 64 held by ground brake 50 and an input sun gear 66 connected through a one-way device 68, as device 30, to the primary turbine 24. The function of the one-way device 68, as will be apparent from the operational summary, is to allow the input sun gear 66 to rotate forwardly faster than the primary turbine 24. Intermeshing with the gears 64 and 66 is a series of planet pinions 70 journaled on an output carrier 72, in turn, connected both to the front gear unit planet carrier 40 and the driven shaft 12. With the reaction ring gear 64 held, the output carrier 72 will rotate at a reduced speed in the same sense as the input sun gear 66.

Rearwardly from and adjacent to the rear planetary gear unit 18 is the reverse planetary gear unit 20. Reverse unit 20 includes a planetary gear set 74 which has an input sun gear 80 connected to the rear unit ring gear 64 and a reaction ring gear 82 held by a hydraulically actuated cone-type brake 84. Gears 80 and 82 intermesh with a series of planet pinions 76 journaled on an input planet carrier 78, in turn, connected to the driven shaft 12. The mode of operation of the reverse unit 20 will be explained in the operational summary.

The transmission is provided with several ranges of operation, namely, neutral, drive, intermediate braking, low braking and reverse, each of which is described hereinafter under the headings denoted.

*Neutral*

For neutral, all of the clutches and brakes are disengaged and the fluid coupling 54 is emptied so that drive cannot be transferred by the torque converter 14 to the driven shaft 12. This is because, with the ground brake 50 and neutral clutch 48 disengaged, there is no operative reaction element for either the front gear unit 16 or the rear gear unit 18. Likewise, the reverse unit 20 is ineffective since the reverse brake 82 is disengaged.

*Drive*

The transmission is conditioned for drive range by engaging both ground brake 50 and neutral clutch 48. An overrun brake 86 of suitable construction, as the disk type illustrated, is also engaged and, when engaged, is arranged to ground the front unit sun gear 38 at 52 so as to prevent rotation thereof in either direction. Rotation of the converter impeller 22 will drive the primary turbine 24 forward and, accordingly, the rear gear unit sun gear 66 in the same direction. Since, as explained, the secondary turbine 26, initially, attempts to rotate backwards, the resultant negative torque tends to drive the front unit ring gear 36 backwards. Because the sun gear 38 is now prevented from rotating forwardly by overrun brake 86, there is an attempt to drive the carrier 40 at a reduced speed also backwards. This is not possible since the planet carrier 72 is driven forwardly by the primary turbine 24 which dominates since it affords a greater positive torque. As a result, the secondary turbine 26 and the front unit gear set 35 together contribute a negative torque and the secondary turbine 26 functions somewhat like a stator with relation to the converter working circuit. If the overrun brake 86 was not engaged at the commencement of drive, the front unit sun gear 38 could rotate forwards without restraint from the one-way device 44 and the secondary turbine then could revolve backwards and produce undesired turbulence in the converter working circuit.

Because of the negative torque from the secondary turbine 26, the overall torque ratio for starting is somewhat reduced. To explain further, reference is made to the following equation for overall torque ratio.

Torque ratio = $T_1 \times RU + T_2 \times FU$ where $T_1$ is the torque multiplication from the primary turbine 24; $T_2$, the torque multiplication from the secondary turbine 26; FU is the torque ratio of the front unit gear set 35; and RU, the torque ratio of the rear unit gear set 62. The reduced overall ratio is apparent from an inspection of the equation, for as can be seen, during the interval that the secondary turbine 26 tends to rotate backwards, the multiple of the secondary turbine and the front gear set ratios has a negative sign and is therefore deducted from the rear unit and primary turbine ratios.

When the impeller 22 attains a certain speed, the secondary turbine 26 will be driven forwardly and commence to deliver a positive torque. At this time the front gear unit 16 is conditioned in the way previously mentioned for a reduced speed drive. Then, at some chosen speed the coupling 54 is filled and the front gear unit 16, as explained, is locked up to complete the upshift. Some time prior to the upshift in the front gear unit 16, it is necessary to disengage overrrun brake 86, preferably just after the secondary turbine 26 starts to rotate forwards. Otherwise, the sun gear 38 would not be free to revolve forwards in direct drive. As the converter speed increases, the secondary turbine 26 will progressively assume a greater proportion of the drive until, eventually, all of the converter drive is from the secondary turbine 26 through the front gear unit 16 and the rear unit carrier 72 to the driven shaft 12. With the carrier 72 being driven in this manner, the rear unit sun gear 66 will be overdriven, i.e., the sun gear 66 will revolve, if the rear gear unit 18 has, e.g., a 3:1 torque ratio, 3 times as fast as the primary turbine 24. The function of the one-way device 68 is to permit this speed-up of the sun gear 66 when it occurs. The transmission is now conditioned for a substantially direct drive.

It should be noted that, since the front unit coupling 54 has the pump 56 thereof connected to the converter impeller 22, the torque delivered to the front gear unit 16 is divided or split with part being supplied from the converter 14 and the other part directly from driving shaft 10. In this manner, the fluid losses through the converter 14 are not as pronounced and the efficiency in the normal driving range is increased.

Intermediate Braking

There are instances when the driver may wish to have engine braking available to a somewhat moderate degree for assistance in slowing down the vehicle. With the front gear unit 16 downshifted and the overrun brake 86 disengaged, no braking is provided by the transmission. One reason for this is that the sun gear 66, as mentioned, can be driven forwardly as it will be with driven shaft 12 driving without restriction by the one-way device 68 and no braking is possible in this direction. Another reason is that since the front and rear unit carriers 40 and 72 are connected together, drive to the front unit carrier 40 will cause the front unit sun gear 38 to rotate forwardly. Because the one-way device 44 is intended to permit forward rotation of the sun gear 38, there is no reaction for the front gear unit 16 which would, otherwise, transfer drive to driving shaft 10, hence braking in this direction is not available either. In the intermediate braking range, reaction is provided for the front gear unit 16. This is accomplished by engaging the overrun brake 86, which will prevent forward rotation of the sun gear 38, and, therefore, the ring gear 36 and the converter secondary turbine 26 will be, as is preferable, overdriven for greater braking resistance from the engine.

Low Braking

A low braking range is furnished if more engine braking is desired than is available in the intermediate braking range. In the low braking range, a clutch 88, interposed between the front unit ring gear 36 and the rear unit sun gear 66, is engaged which ties the rear unit sun gear 66 and the secondary turbine 26 together for conjoint rotation. At this time only the ground brake 50 is maintained engaged and all of the other clutches and brakes including the front unit coupling 54 are inoperative. Then, when the driven shaft 12 drives, the rear unit sun gear 66 is overdriven, previously explained, as are both the front unit ring gear 36 and the converter secondary turbine 26, each of which revolve therewith. Since the secondary turbine 26 is overdriven faster than in the intermediate braking range, the braking effect is greater. The front gear unit 16 is ineffective in this range since no reaction is provided with overrun brake 86 and neutral clutch 48 both disengaged.

Reverse

In the reverse range, both the clutch 88 and the reverse brake 84 are engaged while the ground brake 50 and neutral clutch 48 are disengaged, and front unit coupling 54 is emptied. Hence, drive is provided by the torque converter 14 with both the primary and secondary turbines clutched together by the clutch 88 to the rear unit sun gear 66, the front gear unit 16 being ineffective without reaction. Forward rotation of the sun gear 66 will cause the reaction ring gear 64 to rotate backwards. This reverse rotation is then transferred to the reverse unit sun gear 80 and hence the reverse planet carrier 78 and the driven shaft 12 are driven at a reduced speed in the same direction.

The various clutches and brakes utilized by the transmission may be engaged and disengaged in any appropriate manner. For example, fluid pressure from a suitable source (not shown) may be employed to actuate a piston, such as pistons 90 and 92, which, in turn, engage ground and reverse brakes 50 and 84 respectively in a known way.

From the foregoing it can be seen that a torque converter is combined with gearing in such a way as to utilize to a maximum the advantages a torque converter provides for different operations. In addition, the transmission offers two ranges of engine braking to assist the driver in controlling the vehicle. The number of ratio establishing devices is reduced by using, in this instance, one brake such as ground brake 50 for holding the reaction gears of both the front and rear gear units 16 and 18 rather than having separate brakes. Also, the one gear shaft is produced smoothly and imperceptibly by the coaction of a fill and empty fluid coupling and a one-way device.

The invention is to be limited only by the following claims.

I claim:

1. In a combination; a driving member and a plurality of driven members; a hydrodynamic torque transmitting device interposed between the driving and driven members; the torque transmitting device comprising an impeller element connected to both the driving member and a first one of the driven members, a primary turbine element rotatable with a second one of the driven members, a secondary turbine element rotatable with a third one of the driven members, and a stator provided with plural positionable blades; the torque transmitting device elements cooperating to define a working circuit therebetween, means for preventing reverse rotation of the secondary turbine, and means for clutching together the primary and secondary turbine elements.

2. In combination; a driving member and a plurality of driven members; a torque converter interposed between the driving and driven members; the torque converter comprising an impeller element connected to both the driving member and a first one of the driven members, a primary turbine element rotatable with a second one of the driven members, a secondary turbine element rotatable with a third one of the driven members, and a stator provided with plural positionable blades; the torque converter elements cooperating to define a working circuit therebetween; a brake effective to prevent reverse rotation of the secondary turbine element; a clutch for selectively connecting together the primary and secondary turbines; and a one-way device for allowing the second one of the driven members to rotate forwardly faster than the primary turbine element.

3. In a transmission, the combination of driving and driven shafts, a hydrodynamic torque transmitting devide including an impeller connected to the driving shaft and a plurality of turbines, planetary gearing interposed between the driving and driven shafts for providing a plurality of speed ratios, the gearing including first and second planetary gear units each having input, output, and reaction elements, the first gear unit input element being connected to one of the turbines, the second gear unit input element being connected to another one of the turbines and the output element of each being conlected to the driven shaft, breake means for preventing rotation of the gear unit reaction elements so as to provide one drive ratio through each of the gear units, clutch means for connecting one of the first gear unit elements to the driving shaft so as to provide a split torque drive through the first gear unit at a different drive ratio, and means for allowing rotation of the first gear unit reaction element when both the clutch means and brake means are operative.

4. In a transmission, the combination of driving and driven shafts, a hydrodynamic torque transmitting device including an impeller connected to the driving shaft and a plurality of turbines, planetary gearing interposed between the driving and driven shafts for providing a plurality of speed ratios, the gearing including first and second planetary gear units each having input, output, and reaction elements, the first gear unit input element being connected to one of the turbines, the second gear unit input element being connected to another one of the turbines and the output element of each being connected to the driven shaft, brake means for preventing rotation of both of the gear unit reaction elements so as to provide one drive ratio through each of the gear units, a fluid coupling having the pump thereof rotatable with the driving shaft and the turbine thereof rotatable with one of the first gear unit elements, the fluid coupling being operative, when filled wtih fluid, to afford a split torque drive through the first gear unit at a different drive ratio, and a one-way device interposed between the brake means and the first gear unit reaction element for allowing forward rotation of the first gear unit reaction element when the coupling is filled.

5. In a transmission, the combination of driving and driven shafts, a hydrodynamic torque transmitting device including an impeller connected to the driving shaft and a plurality of turbines, planetary gearing interposed between the driving and driven shafts for providing a plurality of speed ratios, the gearing including first and second planetary gear units each having input, output, and reaction elements, the first gear unit input element being connected to one of the turbines, the second gear unit input element being connected to another one of the turbines and the output element of each being connected to the driven shaft, brake means for preventing rotation of the second gear unit reaction element, first clutch means for connecting the first gear unit reaction element to the first first brake means whereby both gear unit reaction elements are prevented from rotation by the brake means to provide one drive ratio through each of the gear units, second clutch means for connecting one of the first gear elements to the driving shaft to provide a split torque drive through the first gear unit at a different drive ratio, and means for allowing rotation of the first gear unit reaction element when the second clutch means is operative.

6. In a transmission, the combination of driving and driven shafts, a hydrodynamic torque transmitting device including an impeller connected to the driving shaft and a plurality of turbines, planetary gearing interposed between the driving and driven shafts for providing a plurality of speed ratios, the gearing including first and second planetary gear units each having input, output, and reaction elements, the first gear unit input element being connected to one of the turbines, the second gear unit input element being connected to another one of the turbines and the output element of each being connected to the driven shaft, brake means for preventing rotation of the second gear unit reaction element, clutch means for connecting the first gear unit reaction element to the brake means whereby both gear unit reaction elements are held against rotation by the brake means to provide one drive ratio through each of the gear units, a fluid coupling having the pump thereof rotatable by the driving shaft and the turbine thereof rotatable with one of the first gear unit elements, the fluid coupling, when filled with fluid, affording a split torque drive through the first gear unit at a different drive ratio, and a one-way device interposed between the clutch means and the first gear unit reaction element for allowing rotation of the first gear unit reaction element when the coupling is filled.

7. In a transmission, the combination of driving and driven shafts, a hydrodynamic torque transmitting device including an impeller connected to the driving shaft and a plurality of turbines, planetary gearing interposed between the driving and driven shafts for providing a plurality of speed ratios, the gearing including first and second planetary gear units each having input, output, and reaction elements, the first gear unit input element being connected to one of the turbines, the second gear unit input element being connected to another one of the turbines and the output element of each being connected to the driven shaft, brake means for preventing rotation of the second gear unit reaction element, first clutch means for connecting the first gear unit reaction element to the brake means whereby both gear unit reaction elements are prevented from rotation by the brake means to provide one drive ratio through each of the gear units, second clutch means for connecting one of the first gear elements to the driving shaft to provide a split torque drive through the first gear unit at a different drive ratio, means for allowing rotation of the first gear unit reaction element when the second clutch means is operative, and auxiliary brake means for preventing rotation of the first gear unit reaction element in either direction when the second clutch means is inoperative.

8. In a transmission, the combination of driving and driven shafts, a hydrodynamic torque transmitting device including an impeller connected to the driving shaft and a plurality of turbines, planetary gearing interposed between the driving and driven shafts for providing a plurality of speed ratios, the gearing including first and second gear units each having an input gear, a reaction gear and an output planet carrier having planet pinions journaled thereon intermeshing with the input and reaction gears, the front gear unit input gear being connected to one of the turbines and the rear unit input gear being rotatable by another of the turbines, a brake for preventing rotation of the second gear unit reaction gear, a clutch for connecting the first gear unit reaction gear to the brake whereby both gear unit reaction gears are held against rotation by the brake to provide one drive ratio through each gear unit, a fluid coupling having the pump thereof rotatable with the driving shaft and the turbine thereof rotatable with the first gear unit reaction gear, the fluid coupling, when filled with fluid, affording a split torque drive through the first gear unit at a different drive ratio, and a one-way device for allowing forward rotation of the first gear unit reaction gear when the coupling is filled.

9. In a transmission, the combination of driving and driven shafts, a torque converter including an impeller rotatable by the driving shaft, a primary turbine, a secondary turbine and a stator together defining a working circuit, planetary gearing interposed between the driving and driven shafts for providing a plurality of speed ratios and comprising first and second gear units, the first gear unit including an input ring gear connected to the secondary turbine, a reaction sun gear and an output planet carrier having a plurality of planet pinions journaled thereon intermeshing with the sun and ring gears, the second gear unit including an input sun gear rotatable by the primary turbine, a reaction ring gear and an output planet carrier having a plurality of planet pinions journaled thereon intermeshing with the sun and ring gears, the output planet carrier of each gear unit being both connected together and to the driven shaft, a brake for holding the second gear unit ring gear stationary to provide one drive ratio therethrough, a fluid coupling having the pump thereof rotatable with the driving shaft and the turbine thereof rotatable with the first gear unit reaction sun gear, the fluid coupling, when filled with fluid, affording a split torque drive through the first gear unit at one drive ratio, a clutch, a one-way device interposed between the clutch and the first gear unit sun gear, the clutch and the one-way device coacting so as to connect the first gear unit sun gear to the brake so as to hold the first unit sun gear against rotation in one direction and afford another drive ratio therethrough when the coupling is empty, the one-way device and the first unit sun gear being arranged to allow rotation thereof when the coupling is filled, and another one-way device between the primary turbine and the second gear unit sun gear to allow overspeed thereof relative to the primary turbine when the coupling is filled.

10. In a transmission, the combination of driving and driven shafts, a hydrodynamic torque transmitting device including an impeller connected to the driving shaft and a plurality of turbines, planetary gearing interposed between the driving and driven shafts, the gearing including first and second gear units, each having input and output and reaction elements, the first gear unit input element being connected to one of the turbines, the second gear unit input element being connected to another of the turbines and the output element of each being connected to the driven shaft, means for preventing rotation of the first gear unit reaction element in either direction so as to afford one engine braking range through the transmission and means for clutching together the input elements of each gear unit for providing another engine braking range through the transmission.

11. In a transmission, the combination of driving and driven shafts, a hydrodynamic torque transmitting device including an impeller connected to the driving shaft and a plurality of turbines, planetary gearing interposed between the driving and driven shafts, the gearing including first and second gear units, each having input and output and reaction elements, the first gear unit input element being connected to one of the turbines, the second gear unit input element being connected to another of the turbines and the output element of each being connected to the driven shaft, brake means for preventing rotation of the second gear unit reaction element, means for preventing rotation of the first gear unit reaction element in either direction so as to afford one engine braking range through the transmission, and means for clutching together the input elements of each gear unit for providing another engine braking range through the transmission.

12. In a transmission, the combination of driving and driven shafts, a hydrodynamic torque transmitting device including an impeller connected to the driving shaft and a plurality of turbines, planetary gearing interposed between the driving and driven shafts for providing a plurality of speed ratios, the gearing including first and second gear units, each having input and output and reaction elements, the first gear unit input element being connected to one of the turbines, the second gear unit input element being connected to another of the turbines and the output element of each being connected to the driven shaft, brake means for preventing rotation of the second gear unit reaction element so as to provide one drive ratio therethrough, a one-way device held by said brake means for restraining rotation of the first gear unit reaction element in one direction so as to provide one drive ratio through the first gear unit, means for preventing rotation of the first gear unit reaction element in either direction so as to afford one engine braking range through the transmission and means for clutching together the input elements of each gear unit for providing another engine braking range through the transmission.

13. In a transmission, the combination of driving and driven shafts, a hydrodynamic torque transmitting device including an impeller connected to the driving shaft and a plurality of turbines, planetary gearing interposed between the driving and driven shafts for providing a plurality of speed ratios, the gearing including first and second gear units, each having input and output and reaction elements, the first gear unit input element being connected to one of the turbines, the second gear unit input element being connected to another of the turbines and the output element of each being connected to the driven shaft, brake means for preventing rotation of the second gear unit reaction element so as to provide one drive ratio therethrough, a one-way device held by said brake means for restraining rotation of the first gear unit reaction element in one direction so as to provide one drive ratio through the first gear unit, clutch means for connecting one of the first gear unit elements to the driving shaft so as to provide a split torque drive through the first gear unit at a different drive ratio, means for preventing rotation of the first gear unit reaction element in either direction so as to afford one engine braking range through the transmission, and means for clutching together the input elements of each gear unit for providing another engine braking range through the transmission.

14. In a transmission, the combination of driving and driven shafts, a hydrodynamic torque transmitting device including an impeller connected to the driving shaft and a plurality of turbines, planetary gearing interposed between the driving and driven shafts for providing a plurality of speed ratios, the gearing including first and second planetary gear units each having input, output, and reaction elements, the first gear unit input element being connected to one of the turbines, the second gear unit input element being connected to another one of the turbines and the output element of each being connected to the driven shaft, brake means for preventing rotation of the second gear unit reaction element, first clutch means including a one-way device for connecting the first gear unit reaction element to the brake means whereby both gear unit reaction elements are held against rotation by the brake means to provide one drive ratio through each of the gear units, a fluid coupling having the pump thereof rotatable by the driving shaft and the turbine thereof rotatable with one of the first gear unit elements, the fluid coupling, when filled with fluid, affording a split torque drive through the first gear unit at a different drive ratio, the one-way device being arranged to allow forward rotation of the first gear unit reaction element when the coupling is filled, and second clutch means for selectively connecting together the input elements of each gear unit to afford engine braking.

15. In a transmission, the combination of driving and driven shafts, a hydrodynamic torque transmitting device including an impeller connected to the driving shaft and a plurality of turbines, planetary gearing interposed between the driving and driven shafts for providing a plurality of speed ratios, the gearing including first and second planetary gear units each having input, output, and reaction elements, the first gear unit input element being connected to one of the turbines, the second gear unit input element being connected to another one of the turbines and the output element of each being connected to the driven shaft, first brake means for preventing rotation of the second gear unit reaction element, first clutch means including a one-way device for connecting the first gear unit reaction element to the first brake means whereby both gear unit reaction elements are held against rotation by the first brake means to provide one drive ratio through each gear unit, a fluid coupling having the pump thereof rotatable by the driving shaft and the turbine thereof rotatable with one of the first gear unit elements, the fluid coupling, when filled with fluid, affording a split torque drive through the first gear unit at a different drive ratio, the one-way device being arranged to allow forward rotation of the first gear unit reaction element when the coupling is filled, second brake means selectively operable for preventing forward rotation of the first gear unit reaction element, when the coupling is empty, to provide one engine braking range, and second clutch means for selectively connecting together the input elements of each gear unit to afford another engine braking range.

16. In a transmission, the combination of driving and driven shafts, a hydrodynamic torque transmitting device including an impeller connected to the driving shaft and a plurality of turbines, planetary gearing interposed between the driving and driven shafts for providing a plurality of speed ratios, the gearing including first and second gear units each having an input gear, a reaction gear, and an output planet carrier having planet pinions journaled thereon intermeshing with the input and reaction gears, the front gear unit input gear being connected to one of the turbines and the rear unit input gear being rotatable by another of the turbines, means for allowing the rear unit input gear to overspeed relative to said another turbine, a brake for preventing rotation of the second gear unit reaction gear, a first clutch, a one-way device interposed between the first clutch and the first gear unit reaction gear, the first clutch and the one-way device coacting so as to connect the first gear unit reaction gear to the brake whereby both gear unit reaction gears are held against rotation by the brake to provide one drive ratio through each gear unit, a fluid coupling having the pump thereof rotatable with the driving shaft and the turbine thereof rotatable with the first gear unit reaction gear, the fluid coupling, when filled with fluid, affording a split torque drive through the first gear unit at a different drive ratio, the one-way device being arranged so as to allow forward rotation of the first gear unit reaction gear when the coupling is filled, and a second clutch for selectively connecting the input gears of each gear unit together to provide engine braking.

17. In a transmission, the combination of driving and driven shafts, a hydrodynamic torque transmitting device including an impeller connected to the driving shaft and a plurality of turbines, planetary gearing interposed between the driving and driven shafts for providing a plurality of speed ratios, the gearing including first and second gear units each having an input gear, a reaction gear, and an output planet carrier having planet pinions journaled thereon intermeshing with the input and reaction gears, the front gear unit input gear being connected to one of the turbines and the rear unit input gear being rotatable by another of the turbines, means for allowing the rear unit input gear to overspeed relative to said another turbine, a first brake for preventing rotation of the second gear unit reaction gear, a first clutch, a one-way device interposed between the first clutch and the first gear unit reaction gear, the first clutch and the one-way device coacting so as to connect the first gear unit reaction gear to the first brake whereby both gear unit reaction gears are held against rotation by the first brake to provide one drive ratio through each gear unit, a fluid coupling having the pump thereof rotatable with the driving shaft and the turbine thereof rotatable with the first gear unit reaction gear, the fluid coupling, when filled with fluid, affording a split torque drive through the first gear unit at a different drive ratio, the one-way device being arranged so as to allow forward rotation of the first gear unit reaction gear when the coupling is filled, a second brake for selectively preventing rotation of the first gear unit reaction gear in either direction to afford one range of engine braking, and a second clutch for selectively connecting the input gears of each gear unit together to provide another range of engine braking.

18. In a transmission, the combination of driving and driven shafts, a torque converter including an impeller rotatable by the driving shaft, a primary turbine, a secondary turbine and a stator together defining a working circuit, planetary gearing interposed between the driving and driven shafts for providing a plurality of speed ratios and comprising first and second gear units, the first gear unit including an input ring gear connected to the secondary turbine, a reaction sun gear and an output planet carrier having a plurality of planet pinions journaled thereon intermeshing with the sun and ring gears, the second gear unit including an input sun gear rotatable by the primary turbine, a reaction ring gear and an output planet carrier having a plurality of planet pinions journaled thereon intermeshing with the sun and ring gears, the output planet carrier of each gear unit being both connected together and to the driven shaft, a brake for holding the second gear unit ring gear stationary to provide one drive ratio therethrough, a fluid coupling having the pump thereof rotatable with the driving shaft and the turbine thereof rotatable with the first gear unit reaction sun gear, the fluid coupling, when filled with fluid, affording a split torque drive through the first gear unit at one drive ratio, a first clutch, a one-way device interposed between the first clutch and the front gear unit sun gear, the first clutch and the one-way device coacting to connect the first gear unit sun gear to the brake so as to hold the first gear unit sun gear against rotation in one direction and afford another drive ratio therethrough when the coupling is empty, the one-way device being arranged to allow rotation thereof when the coupling is filled, another one-way device between the primary turbine and the second gear unit sun gear to allow overspeed thereof relative to the primary turbine when the coupling is filled, and a second clutch for selectively connecting the first gear unit ring gear and the second gear unit sun gear together to afford engine braking.

19. In a transmission, the combination of driving and driven shafts, a torque converter including an impeller rotatable by the driving shaft, a primary turbine, a secondary turbine and a stator together defining a working circuit, planetary gearing interposed between the driving and driven shafts for providing a plurality of speed ratios and comprising first and second gear units, the first gear unit including an input ring gear connected to the secondary turbine, a reaction sun gear and an output planet carrier having a plurality of planet pinions journaled thereon intermeshing with the sun and ring gears, the second gear unit including an input sun gear rotatable by the primary turbine, a reaction ring gear and an output planet carrier having a plurality of planet pinions journaled thereon intermeshing with the sun and ring gears, the output planet carrier of each gear unit being both connected together and to the driven shaft, a first brake for holding the second gear unit ring gear stationary to provide one drive ratio therethrough, a fluid coupling having the pump thereof rotatable with the driving shaft and the turbine thereof rotatable with the first gear unit reaction sun gear, the fluid coupling, when filled with fluid, affording a split torque drive through the first gear unit at one drive ratio, a first clutch, a one-way device interposed between the first clutch and the front gear unit sun gear, the first clutch and the one-way device coacting to connect the first gear unit sun gear to the first brake so as to hold the first gear unit sun gear against rotation in one direction and afford another drive ratio therethrough when the coupling is empty, the one-way device being arranged to allow rotation thereof when the coupling is filled, another one-way device between the primary turbine and the second gear unit sun gear to allow overspeed thereof relative to the primary turbine when the coupling is filled, a second brake selectively operable for preventing rotation of the front unit sun gear in either direction when the coupling is empty to furnish one range of engine braking, and a second clutch for selectively connecting the first gear unit ring gear and the second gear unit sun gear together to afford another range of engine braking.

20. In a transmission, the combination of driving and driven shafts, a hydrodynamic torque transmitting device including an impeller connected to the driving shaft and primary and secondary turbines, planetary gearing interposed between the driving and driven shafts for providing a plurality of speed ratios, the gearing including first and second planetary gear units each having input, output, and reaction elements; the first gear unit input element being connected to the secondary turbine, the second gear unit input element being connected to the primary turbine, the output elements of each gear unit being connected to the driven shaft; brake means preventing rotation of the reaction elements in one direction so as to promote the imposition of a positive torque on the driven shaft; the brake means including a brake for preventing rotation of the first gear unit reaction element in either direction during the interval that the secondary turbine initially tends to revolve backwards relative to the impeller and primary turbine and thereby impose a negative torque on the driven shaft; the planetary gear units providing drive ratios of a predetermined relationship when the brake means is operative so that, during the interval that the secondary turbine tends to revolve backwards, the product of the second gear unit drive ratio and the positive torque from the primary turbine is greater than the product of the negative torque from the secondary turbine and the first gear unit drive ratio, thereby preventing the secondary turbine from revolving backwardly.

References Cited in the file of this patent

UNITED STATES PATENTS

| | | |
|---|---|---|
| 2,601,045 | Mayner | June 17, 1952 |
| 2,737,827 | Seybold | Mar. 13, 1956 |
| 2,749,777 | Simpson | June 12, 1956 |
| 2,803,974 | Kelley | Aug. 27, 1957 |
| 2,814,214 | Kelley | Nov. 26, 1957 |
| 2,851,906 | De Lorean | Sept. 16, 1958 |
| 2,903,912 | Edsall et al. | Sept. 15, 1959 |